US012698031B2

(12) United States Patent (10) Patent No.: US 12,698,031 B2
Nakamura (45) Date of Patent: Aug. 4, 2026

(54) CONTROL DEVICE, CONTROL METHOD, AND CONTROL SYSTEM

(71) Applicant: HITACHI ASTEMO, LTD., Hitachinaka (JP)

(72) Inventor: Ken Nakamura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/840,559

(22) PCT Filed: Mar. 6, 2023

(86) PCT No.: PCT/JP2023/008223
§ 371 (c)(1),
(2) Date: Aug. 22, 2024

(87) PCT Pub. No.: WO2023/171595
PCT Pub. Date: Sep. 14, 2023

(65) Prior Publication Data
US 2025/0178663 A1     Jun. 5, 2025

(30) Foreign Application Priority Data

Mar. 11, 2022     (JP) .................................. 2022-037973

(51) Int. Cl.
B62D 6/00          (2006.01)
B60W 30/045     (2012.01)
B60W 40/114     (2012.01)

(52) U.S. Cl.
CPC ........... B62D 6/003 (2013.01); B60W 30/045 (2013.01); B60W 40/114 (2013.01);
(Continued)

(58) Field of Classification Search
CPC ......... B62D 6/003; B62D 6/007; B62D 6/008
See application file for complete search history.

(56) References Cited

U.S. PATENT DOCUMENTS 4,666,013 A  *  5/1987  Shibahata  ..............  B62D 7/146
                                                                    91/368
5,799,745 A  *  9/1998  Fukatani  ...............  B62D 7/159
                                                                    701/41

(Continued)

FOREIGN PATENT DOCUMENTS

JP          2008056134 A  *  3/2008
JP          2008-238934 A     10/2008
JP          5126357 B2     1/2013

OTHER PUBLICATIONS

International Search Report dated May 23, 2023 issued in International Application No. PCT/JP2023/008223, with English translation, 5 pages.

(Continued)

*Primary Examiner* — Lindsay M Low
*Assistant Examiner* — Brian R Kirby
(74) *Attorney, Agent, or Firm* — FOLEY & LARDNER LLP

(57) ABSTRACT

A control device, a control method, and a control system according to the present invention each actively allow an amount of change in a yaw rate, which is generated in the vehicle in response to a steering operation, per unit time to be changed in a vehicle including a steer-by-wire steering apparatus on the basis of a first physical quantity related to operation information on a steering operation input device and a second physical quantity related to acceleration and deceleration of the vehicle. This makes it possible to increase the steering easiness or increase the steering accuracy.

13 Claims, 7 Drawing Sheets

(52) U.S. Cl.
CPC . *B60W 2520/105* (2013.01); *B60W 2520/125* (2013.01); *B60W 2540/18* (2013.01); *B60W 2540/30* (2013.01); *B60W 2720/14* (2013.01)

(56) References Cited

U.S. PATENT DOCUMENTS

| | | | | |
|---|---|---|---|---|
| 5,991,675 | A * | 11/1999 | Asanuma | B60G 17/0195 701/41 |
| 2003/0060960 | A1 * | 3/2003 | Hartmann | B62D 6/007 701/1 |
| 2004/0133326 | A1 * | 7/2004 | Ghoneim | B62D 6/007 701/1 |
| 2008/0114511 | A1 * | 5/2008 | Sakugawa | B60W 10/20 701/41 |
| 2010/0211270 | A1 * | 8/2010 | Chin | B62D 6/007 701/44 |
| 2010/0250068 | A1 | 9/2010 | Yamazaki | |
| 2011/0172872 | A1 * | 7/2011 | Takahashi | B60G 17/0162 701/31.4 |
| 2012/0109464 | A1 * | 5/2012 | Mizutani | B62D 6/003 701/1 |
| 2014/0008141 | A1 * | 1/2014 | Kageyama | B60G 3/20 180/400 |
| 2015/0175196 | A1 * | 6/2015 | Ohmura | B60T 8/1755 701/42 |
| 2015/0291210 | A1 * | 10/2015 | Kageyama | B62D 5/04 701/41 |
| 2017/0051697 | A1 * | 2/2017 | Campbell | H04W 4/90 |
| 2019/0023263 | A1 * | 1/2019 | Shoji | B60T 8/1755 |
| 2020/0062294 | A1 * | 2/2020 | Kodera | B62D 5/008 |
| 2020/0339187 | A1 * | 10/2020 | Tamaizumi | B62D 5/0463 |
| 2021/0300457 | A1 * | 9/2021 | Kuribayashi | B62D 6/002 |
| 2022/0097758 | A1 * | 3/2022 | Kasai | B62D 6/008 |

OTHER PUBLICATIONS

International Preliminary Report on Patentability dated Sep. 26, 2024 issued in International Application No. PCT/JP2023/008223, with English translation, 14 pages.

* cited by examiner

CONTROL DEVICE, CONTROL METHOD, AND CONTROL SYSTEM

TECHNICAL FIELD

The present invention relates to a control device, to a control method, and to a control system.

BACKGROUND ART

A target turning angle calculation part of a steering device of a vehicle according to Patent Document 1 calculates a target turning angle $\delta*$ on the basis of a steering angle $\theta$ and vehicle speed V.

In addition, the correction turning angle calculation part calculates a transfer function K(s) having, as an input, a target turning speed $\delta*'$ obtained by time derivative of the target turning angle $\delta*$ and, as an output, a correction turning angle $\delta c$ in accordance with the vehicle speed V by using the difference between a transfer function G(s) having, as an input, a turning angle $\delta$ and, as an output, a yaw rate $\gamma$ of the vehicle, and a stationary component G(0) of this transfer function G(s).

The correction turning angle calculation part then multiplies the transfer function K(s) and the target turning speed $\delta*'$ to calculate the correction turning angle $\delta c$ and a final target turning angle calculation part 53 sums up the target turning angle $\delta*$ and the correction turning angle $\delta c$ to calculate a final target turning angle $\delta d$.

REFERENCE DOCUMENT LIST

Patent Document

Patent Document 1: JP 5126357 B

SUMMARY OF THE INVENTION

Problem to be Solved by the Invention

Incidentally, the amount of change in a yaw rate per unit time influences a driver's steerability, and the yaw rate is generated in a vehicle in response to a steering operation by the driver. Generally, when the amount of change in the yaw rate (in other words, the speed of change in the yaw rate) per unit time is large, it is difficult to perform an appropriate steering operation.

For example, a vehicle has characteristics that, while the vehicle is decelerating and making a turn, the amount of change in the yaw rate per unit time differs in accordance with the deceleration and the lateral acceleration. When the amount of change increases, the steering easiness and the steering accuracy may decrease.

The present invention has been devised in view of these conventional circumstances. An object of the present invention is to provide a control device, a control method, and a control system that each make it possible to increase the steering easiness or increase the steering accuracy.

Means for Solving the Problem

An aspect of the invention according to the present invention includes a control device, a control method, and a control system that are each applied to a vehicle including a steer-by-wire steering apparatus. The steer-by-wire steering apparatus includes a steering operation input device, and a steering device including a steering actuator. On the basis of a first physical quantity related to operation information on the steering operation input device and a second physical quantity related to acceleration and deceleration of the vehicle, an amount of change in a yaw rate per unit time is actively allowed to be changed, and the yaw rate is generated in the vehicle in response to the steering operation.

Effects of the Invention

According to the present invention, it is possible increase the steering easiness or increase the steering accuracy.

MODE FOR CARRYING OUT THE INVENTION

An embodiment of a control device, a control method, and a control system according to the present invention will be described below on the basis of the drawings.

Figure 1:
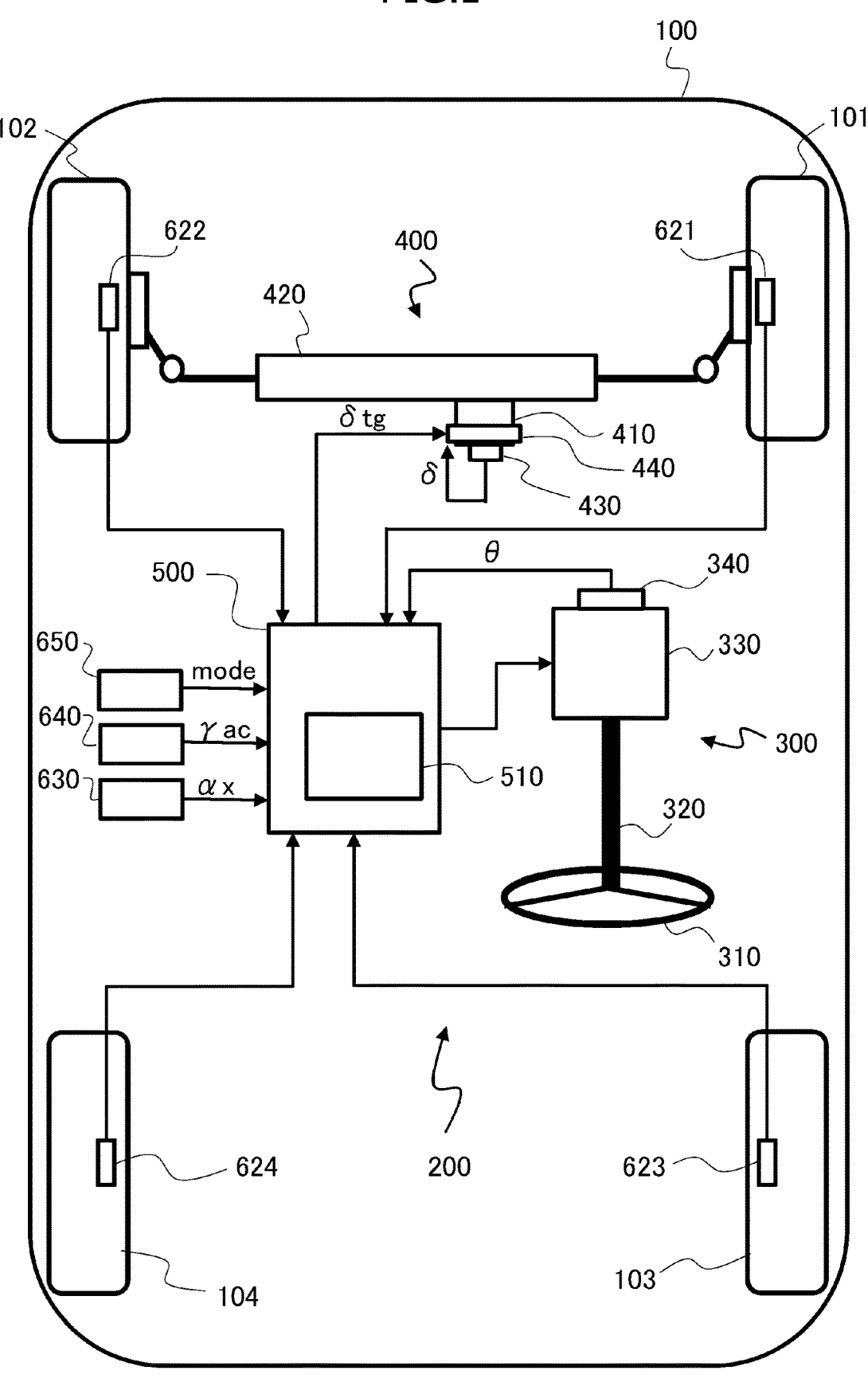
FIG. 1 is a schematic diagram of a vehicle including a steer-by-wire steering apparatus.

FIG. 1 is a schematic diagram illustrating an aspect of a vehicle 100 on which a steer-by-wire steering apparatus 200 is mounted.

Vehicle 100 is a four-wheeled automobile including a pair of left and right front wheels 101 and 102 and a pair of left and right rear wheels 103 and 104 as wheels.

Steer-by-wire steering apparatus 200 includes a steering operation input device 300 that receives a steering operation of a driver of vehicle 100, a steering device 400 including a steering actuator that applies a steering force to a wheel of vehicle 100, and a control device 500 that controls an actuator of steering apparatus 200.

Steering operation input device 300 and steering device 400 are then mechanically separated.

Steering operation input device 300 includes a steering wheel 310, a steering shaft 320, a reaction force motor 330, and an operation angle sensor 340.

Steering wheel 310 is a steering operation receiving member that is operated by a driver of vehicle 100.

Reaction force motor 330 is a reaction force actuator that applies reaction torque to steering wheel 310.

Operation angle sensor 340 detects the rotation angle of steering shaft 320 as an operation angle $\theta$ of steering wheel 310.

It is to be noted that the operation angle $\theta$ detected by operation angle sensor 340 is a physical quantity related to operation information on steering operation input device 300.

Steering device 400 includes a steering motor 410 that serves as a steering actuator, a steering mechanism 420 that changes the steering angle of front wheels 101 and 102 with steering torque generated by steering motor 410, and a steering angle sensor 430 that detects a front wheel steering angle $\delta$ which is the turning angle of front wheels 101 and 102 from the position of steering motor 410 or the position of steering mechanism 420.

Steering device 400 is then a device capable of steering front wheels 101 and 102 that are the steered wheels of vehicle 100 by actuating steering motor 410.

Steering motor 410 integrally includes a motor driving device 440 that controls steering motor 410.

Motor driving device 440 controls electric power to be applied to steering motor 410, in other words, steering torque generated by steering motor 410 to bring front wheel steering angle $\delta$ detected by steering angle sensor 430 closer to a steering angle command value $\delta$tg acquired from control device 500.

Additionally, it is possible for control device 500 to integrally include motor driving device 440.

Control device 500 is an electronic control device of which a main constituent is a microcomputer 510.

Microcomputer 510 includes an MPU (Microprocessor Unit), a ROM (Read Only Memory), and a RAM (Random Access Memory).

Microcomputer 510 then carries out calculation processing with a variety of signals acquired from the outside to obtain a control signal of reaction force motor 330 and a control signal of steering motor 410, and outputs the obtained control signals.

That is, microcomputer 510 has a function of a controller that controls steering motor 410 and reaction force motor 330.

Here, on the basis of information on the operation angle $\theta$ or the like of steering wheel 310 in controlling steering motor 410, microcomputer 510 calculates the steering angle command value $\delta$tg which is a target value of the front wheel steering angle $\delta$.

Microcomputer 510 then outputs the signal of the steering angle command value $\delta$tg to motor driving device 440 as a control signal of steering motor 410.

In addition, vehicle 100 includes road wheel speed sensors 621 to 624 that detect wheel speeds which are the rotation speeds of respective wheels 101 to 104.

In addition, vehicle 100 includes a longitudinal acceleration sensor 630 that detects longitudinal acceleration $\alpha$x (if described in detail, the acceleration and deceleration of vehicle 100 in the traveling direction) of vehicle 100.

In addition, vehicle 100 includes a yaw rate sensor 640 that detects a yaw rate $\gamma$ac of vehicle 100.

Furthermore, vehicle 100 includes a mode selection switch 650.

As described in detail below, mode selection switch 650 is a user interface for a driver to optionally select the response characteristics of a vehicle behavior with respect to an operation on steering wheel 310 by the driver.

Figure 2:
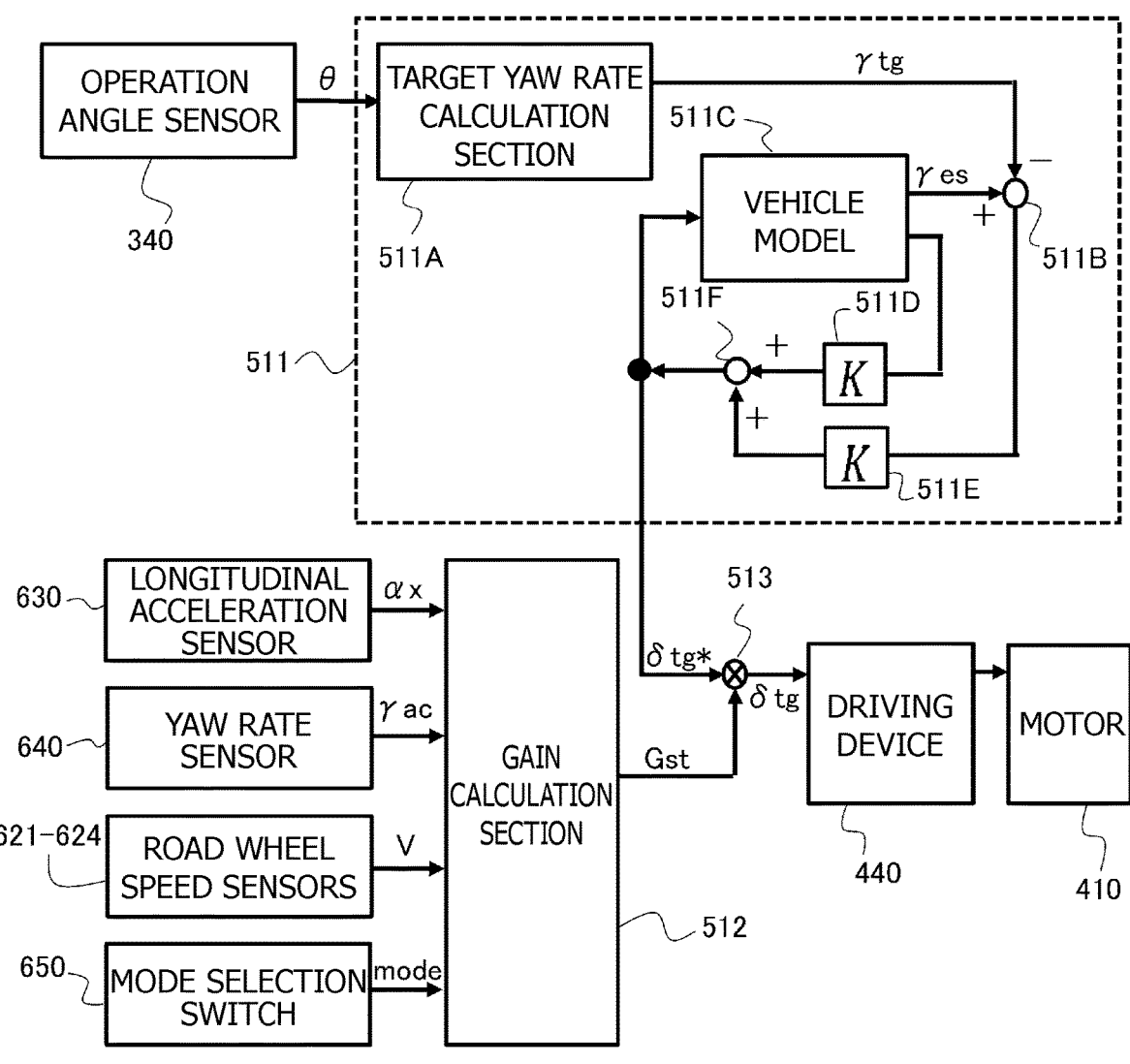
FIG. 2 is a block diagram illustrating a control function of a steering motor.

FIG. 2 is a block diagram illustrating an aspect of a control function of steering motor 410 by microcomputer 510.

Microcomputer 510 includes a model following control section 511, a gain calculation section 512, and a multiplication section 513.

Model following control section 511 carries out control (that will be referred to as yaw rate control below) for setting a steering angle command value $\delta$tg* to cause a yaw rate $\gamma$ generated in vehicle 100 to follow a target yaw rate $\gamma$tg corresponding to the operation amount of steering wheel 310.

It is to be noted that model following control section 511 estimates the yaw rate $\gamma$ generated in vehicle 100 by using a vehicle model having the front wheel steering angle $\delta$ as an input value.

If described in detail, model following control section 511 includes a target yaw rate calculation section 511A, a comparison section 511B, a vehicle model 511C, a first gain section 511D, a second gain section 511E, and an addition section 511F.

Target yaw rate calculation section 511A acquires the information on the operation angle $\theta$ of steering wheel 310 from operation angle sensor 340 and obtains the target yaw rate $\gamma$tg on the basis of the acquired information on the operation angle $\theta$.

For example, target yaw rate calculation section 511A obtains a base front wheel steering angle $\delta$bs ($\delta$bs=$\theta$/N), for example, from the operation angle $\theta$ and a steering gear ratio N and calculates the target yaw rate $\gamma$tg on the basis of the base front wheel steering angle $\delta$bs by using a transfer function of first-order delay expressed by a steady-state yaw rate gain and a time constant.

Vehicle model 511C has the steering angle command value $\delta$tg* as an input value and has an estimation yaw rate $\gamma$es and an estimation vehicle body slip angle $\beta$es as output values. In other words, model following control section 511 obtains, by using vehicle model 511C, the estimation yaw rate $\gamma$es that is an estimation value of the yaw rate $\gamma$ generated in vehicle 100.

Comparison section 511B acquires the signal of the estimation yaw rate $\gamma$es output by vehicle model 511C and the signal of the target yaw rate $\gamma$tg output by the target yaw rate calculation section 511A and calculates a deviation $\gamma$er between the estimation yaw rate $\gamma$es and the target yaw rate $\gamma$tg.

First gain section 511D multiplies the estimation vehicle body slip angle $\beta$es output by vehicle model 511C by a gain K1 and second gain section 511E multiplies the deviation $\gamma$er by a gain K2.

Addition section 511F then sums up the output of first gain section 511D and the output of second gain section 511E to obtain the steering angle command value $\delta$tg* that is a command value of the front wheel steering angle $\delta$.

Here, the steering angle command value $\delta$tg* serves as the front wheel steering angle $\delta$ requested for causing the estimation yaw rate $\gamma$es to follow the target yaw rate $\gamma$tg.

Addition section 511F outputs the obtained steering angle command value $\delta$tg* to vehicle model 511C and causes vehicle model 511C to estimate the yaw rate $\gamma$ and a vehicle body slip angle $\beta$ obtained when the front wheel steering angle $\delta$ is controlled to be the steering angle command value $\delta$tg*.

In addition, addition section 511F outputs the obtained steering angle command value $\delta$tg* to multiplication section 513.

It is to be noted that processing of setting the steering angle command value $\delta$tg* is not limited to model following control having the estimation yaw rate $\gamma$es output by vehicle model 511C as a feedback signal.

It is possible for microcomputer 510 to include, instead of model following control section 511, a feedback control section that has the yaw rate $\gamma$ac of vehicle 100 detected by yaw rate sensor 640 as a feedback signal and sets the steering angle command value $\delta$tg* to cause the yaw rate $\gamma$ac to follow the target yaw rate $\gamma$tg.

However, the model following control has less control delay than in a case in which the yaw rate $\gamma$ac that is a detection value of yaw rate sensor 640 is used as a feedback signal, and makes it possible to cause the yaw rate generated in vehicle 100 to stably follow the target yaw rate $\gamma$tg.

Multiplication section 513 acquires the steering angle command value $\delta$tg* obtained by addition section 511F and a gain Gst calculated by gain calculation section 512.

Multiplication section 513 then multiplies the steering angle command value $\delta$tg* by the gain Gst to obtain the final steering angle command value $\delta$tg ($\delta$tg=$\delta$tg*×Gst) and outputs the obtained steering angle command value $\delta$tg to motor driving device 440.

As described in detail below, multiplication section 513 and gain calculation section 512 are included in a functional section for actively allowing the amount of change in the yaw rate $\gamma$, which is generated in vehicle 100 in response to a steering operation by a driver, per unit time to be changed.

Gain calculation section 512 acquires the signal of the longitudinal acceleration $\alpha$x detected by longitudinal acceleration sensor 630, the signal of the yaw rate $\gamma$ac detected by yaw rate sensor 640, the signal of the vehicle speed V obtained from detection signals of road wheel speed sensors 621 to 624, and mode selection information that is operation position information on mode selection switch 650.

Gain calculation section 512 then obtains the gain Gst that is a control gain of yaw rate control on the basis of the various kinds of acquired information and outputs the signal of the obtained gain Gst to multiplication section 513.

The reference value of the gain Gst is 1.0.

Then, in a case in which the gain Gst is less than 1.0, the steering angle command value $\delta$tg is set to a value less than the steering angle command value $\delta$tg*. In a case in which the gain Gst is greater than 1.0, the steering angle command value $\delta$tg is set to a value greater than the steering angle command value $\delta$tg*.

The control for actively allowing the amount of change in the yaw rate $\gamma$ per unit time to be changed will be described in detail below.

Figure 3:
FIG. 3 is a line diagram illustrating a correlation between lateral acceleration and deceleration, and an amount $\Delta\gamma$ of change in a yaw rate $\gamma$ per unit time.

FIG. 3 is a line diagram in which the x axis represents lateral acceleration $\alpha$y of vehicle 100, the y axis represents deceleration $\alpha$x of vehicle 100, and the z axis an amount $\Delta\gamma$ of change in the yaw rate $\gamma$ between the start of deceleration and the passage of the unit time. FIG. 3 illustrates the characteristics of the amount $\Delta\gamma$ of change in a case in which steering motor 410 is controlled by using the steering angle command value $\delta$tg* obtained by model following control section 511 as the final steering angle command value $\delta$tg ($\delta$tg*=$\delta$tg) as it is.

The line diagram of FIG. 3 illustrates characteristics that the amount $\Delta\gamma$ of change in a turning direction increases as the lateral acceleration $\alpha$y increases at the time of slow deceleration.

The situation of the slow deceleration and the high lateral acceleration $\alpha$y occurs, for example, when vehicle 100 traveling on an ordinary road avoids an obstacle or when a driver who drives a bit roughly makes a lane change.

Such a situation may induce a spinout behavior of vehicle 100 when the amount $\Delta\gamma$ of change in the yaw rate $\gamma$ in the turning direction of vehicle 100 is large.

Here, if a driver of vehicle 100 is an experienced driver having a high level of driving skill, it is possible to understand vehicle characteristics related to the amount $\Delta\gamma$ of change, that is, the characteristics that the amount $\Delta\gamma$ of change increases at the time of the slow deceleration and the high lateral acceleration $\alpha$y, and then perform an appropriate steering operation.

However, in the case of an ordinary driver having a lower driving skill than that of an experienced driver, it is difficult to perform an appropriate steering operation when the amount $\Delta\gamma$ of change increases. An ordinary driver may be in a situation in which a skid preventing device of vehicle 100 is actuated.

Accordingly, microcomputer 510 carries out the control for actively allowing the amount of change in the yaw rate $\gamma$ per unit time to be changed in response to a steering operation by a driver, thereby avoiding, for example, the situation of the intervention of the skid preventing device and achieving steering characteristics that are easy to handle for an ordinary driver.

That is, microcomputer 510 actively allows the amount $\Delta\gamma$ of change in the yaw rate $\gamma$ per unit time corresponding to a steering operation to be changed for each region obtained by combining the deceleration $\alpha$x and the lateral acceleration $\alpha$y illustrated in FIG. 3, thereby suppressing an increase in the amount $\Delta\gamma$ of change and more smoothly join the amounts $\Delta\gamma$ of change of the respective regions.

This makes it possible to make more gradual the change in the yaw rate $\gamma$ per unit time corresponding to a steering operation, for example, in the situation of the slow deceleration and the high lateral acceleration $\alpha$y, and lower the difficulty of a steering operation and increase safety for an ordinary driver.

In addition, in the case of an experienced driver (or a professional driver), stopping the control for suppressing an increase in the amount $\Delta\gamma$ of change or carrying out the control for actively increasing the amount $\Delta\gamma$ of change makes it possible to set the responsiveness of a vehicle behavior that matches the preference of the driver.

It is to be noted that microcomputer 510 achieves the control for actively allowing the amount $\Delta\gamma$ of change in the yaw rate $\gamma$ per unit time corresponding to a steering operation to be changed through processing of setting the gain Gst by gain calculation section 512 as described above.

Subsequently, the control for actively allowing the amount of change in the yaw rate $\gamma$ per unit time to be changed will be specifically described.

Figure 4:
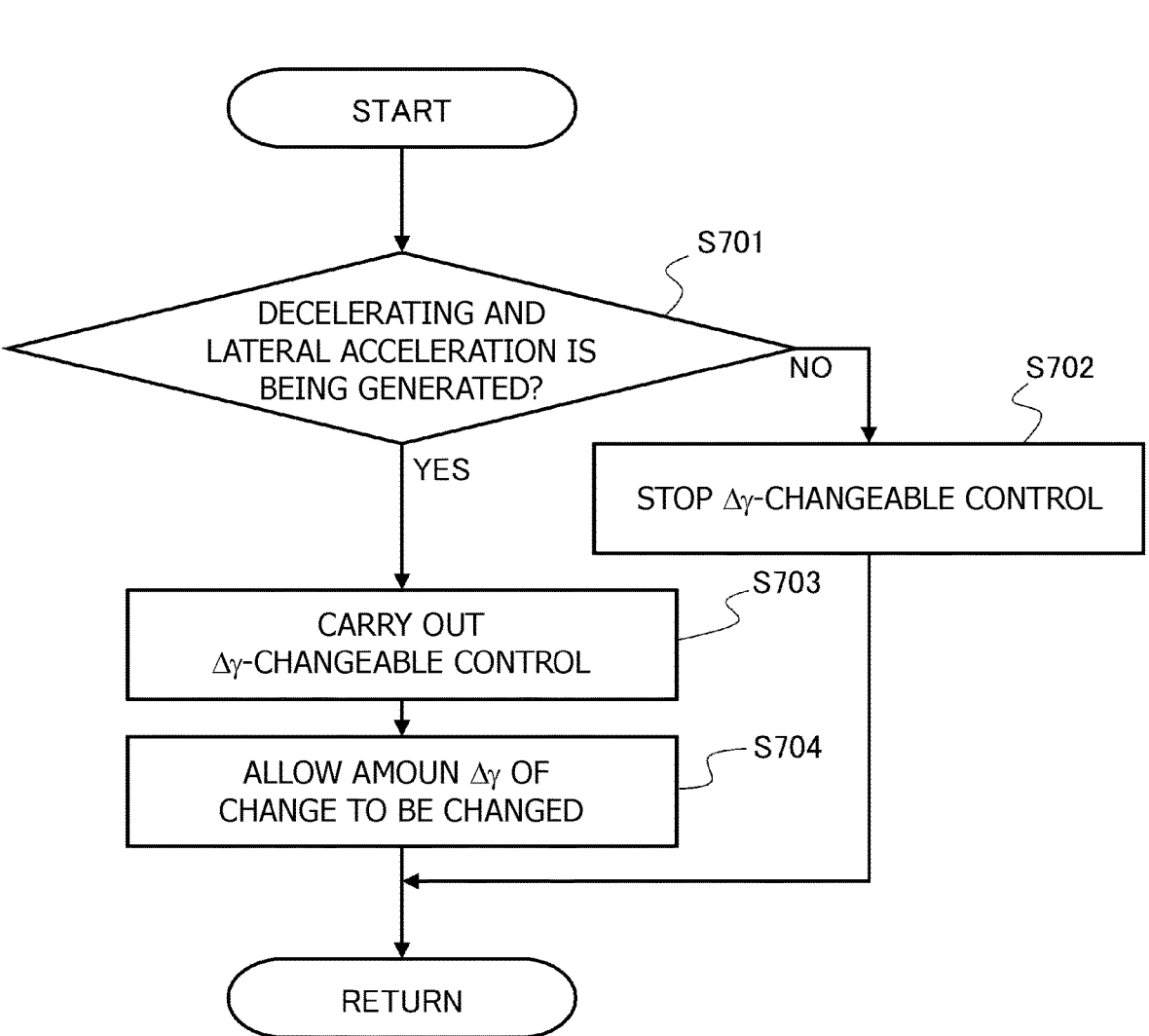
FIG. 4 is a flowchart illustrating a process of control for actively allowing the amount $\Delta\gamma$ of change to be changed.

FIG. 4 is a flowchart illustrating a process of the control for actively allowing the amount $\Delta\gamma$ of change to be changed that is carried out by microcomputer 510. In other words, FIG. 4 is a flowchart illustrating a process of setting the gain Gst that is carried out by gain calculation section 512.

Microcomputer 510 determines in step S701 whether or not vehicle 100 is decelerating and lateral acceleration is being generated, in other words, whether or not vehicle 100 is in a region obtained by combining the deceleration $\alpha$x and the lateral acceleration $\alpha$y.

Here, microcomputer 510 determines whether or not vehicle 100 is decelerating on the basis of the longitudinal acceleration $\alpha$x of vehicle 100 detected by longitudinal acceleration sensor 630.

In addition, microcomputer 510 obtains the lateral acceleration $\alpha$y from the yaw rate $\gamma$ac detected by yaw rate sensor 640 and the vehicle speed V detected by road wheel speed sensors 621 to 624 and determines whether or not lateral acceleration is being generated.

It is to be noted that, in a case in which vehicle 100 includes a lateral acceleration sensor that detects the lateral acceleration $\alpha$y, it is possible for microcomputer 510 to determine whether or not lateral acceleration is being generated on the basis of the lateral acceleration $\alpha$y detected by the lateral acceleration sensor.

When vehicle 100 is not in the state in which vehicle 100 is decelerating and lateral acceleration is being generated, microcomputer 510 proceeds to step S702 and stops the Δγ-changeable control for actively allowing the amount Δγ of change to be changed by changing the gain Gst.

Here, microcomputer 510 carries out processing of fixing the value of the gain Gst at 1.0 in step S702 and sets the steering angle command value δtg* obtained by model following control section 511 as the final steering angle command value δtg as it is, thereby making it possible to substantially stop the Δγ-changeable control for actively allowing the amount Δγ of change to be changed.

In contrast, when vehicle 100 is in the state in which vehicle 100 is decelerating and lateral acceleration is being generated, microcomputer 510 proceeds to step S703 and makes settings to carry out the Δγ-changeable control for actively allowing the amount Δγ of change to be changed, that is, control for allowing the gain Gst to be changed.

Subsequently, microcomputer 510 proceeds to step S704 and executes the Δγ-changeable control for actively allowing the amount Δγ of change to be changed, that is, processing of allowing the gain Gst to be changed.

Figure 5:
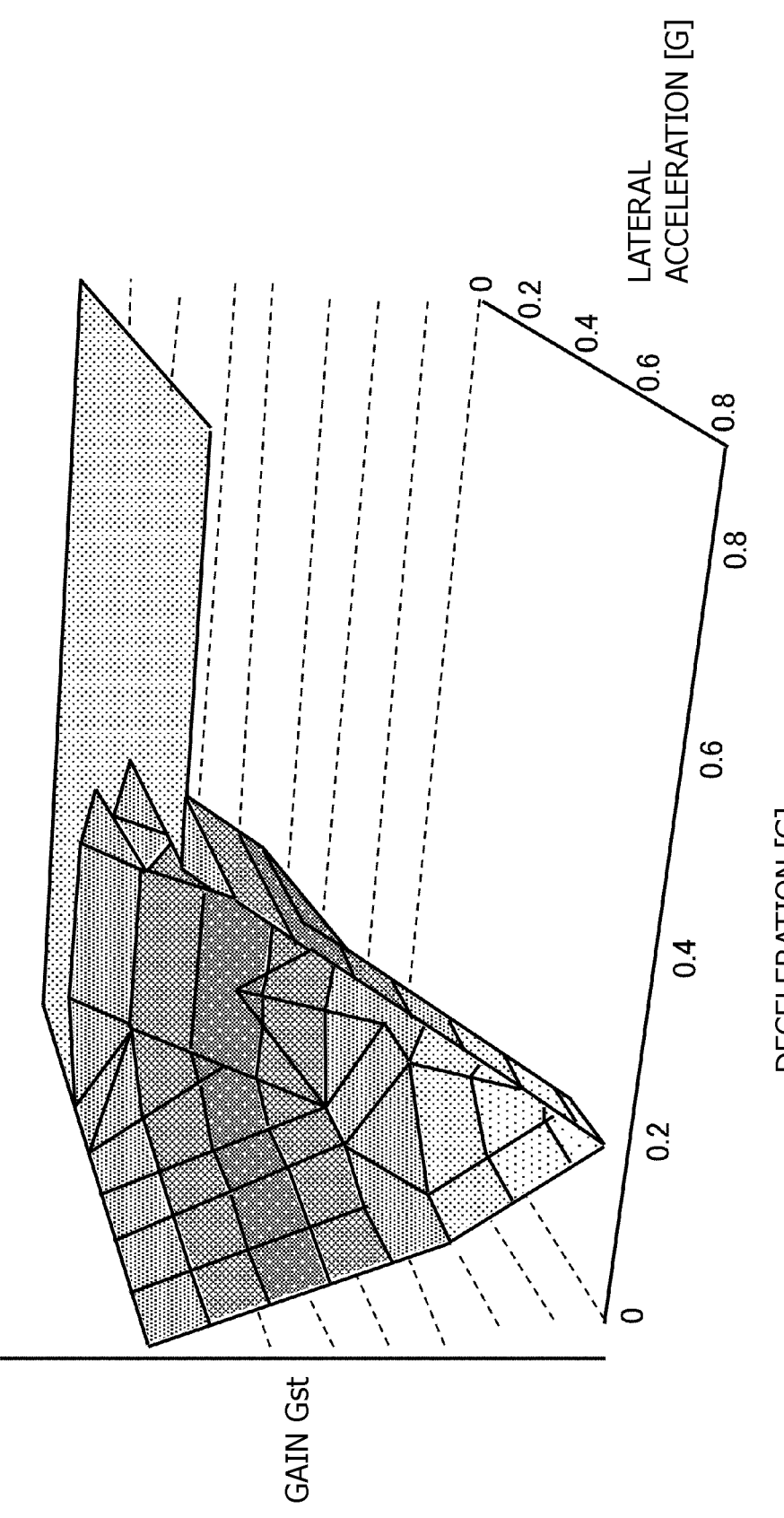
FIG. 5 is a line diagram illustrating a correlation between the lateral acceleration and the deceleration, and a gain Gst.

FIG. 5 is a line diagram in which the x axis represents the deceleration αx, the y axis represents the lateral acceleration αy of vehicle 100, and the z axis represents the gain Gst. FIG. 5 illustrates an aspect of the characteristics of the gain Gst for each region obtained by combining the deceleration Δx and the lateral acceleration αy.

The characteristics of the gain Gst illustrated in FIG. 5 correspond to the characteristics of the amount Δγ of change illustrated in FIG. 3 and are set to suppress an increase in the amount Δγ of change.

That is, since the amount Δγ of change in the turning direction increases as the lateral acceleration αy increases when vehicle 100 slowly decelerates, microcomputer 510 (gain calculation section 512) sets the gain Gst to a smaller value as the lateral acceleration αy increases at the time of the slow deceleration.

In other words, the gain Gst is decreased for a combination of the deceleration αx and the lateral acceleration αy for which the amount Δγ of change increases in the characteristic line diagram of FIG. 3 as compared with a combination of the deceleration αx and the lateral acceleration αy for which the amount Δγ of change is relatively small in the characteristic line diagram of FIG. 3.

When the gain Gst is decreased (if described in detail, the gain Gst is decreased to less than 1.0), an increase in the steering angle command value δtg in the steering-increase direction is delayed and it is possible to suppress an increase in the amount Δγ of change as compared with a case in which the control for actively allowing the amount Δγ of change to be changed by changing the gain Gst is not carried out (in the case of a gain Gst of 1.0 if described in detail).

In this way, microcomputer 510 sets the gain Gst to allow the gain Gst to be changed for each combination of the deceleration αx and the lateral acceleration αy to suppress an increase in the amount Δγ of change in the state in which vehicle 100 is decelerating and lateral acceleration is being generated.

This makes it possible to suppress the amount Δγ of change in the yaw rate γ per unit time corresponding to a steering operation even in the situation of the slow deceleration and the high lateral acceleration αy and more smoothly join the amounts Δγ of change of the respective regions obtained by combining the deceleration αx and the lateral acceleration αy. It is thus possible to lower the difficulty of a steering operation and increase safety in the case of an ordinary driver.

That is, the Δγ-changeable control suppresses an increase in the amount Δγ of change, thereby allowing even an ordinary driver to perform an appropriate steering operation and making it possible to avoid a situation in which the skid preventing device of vehicle 100 is actuated.

Figure 6:
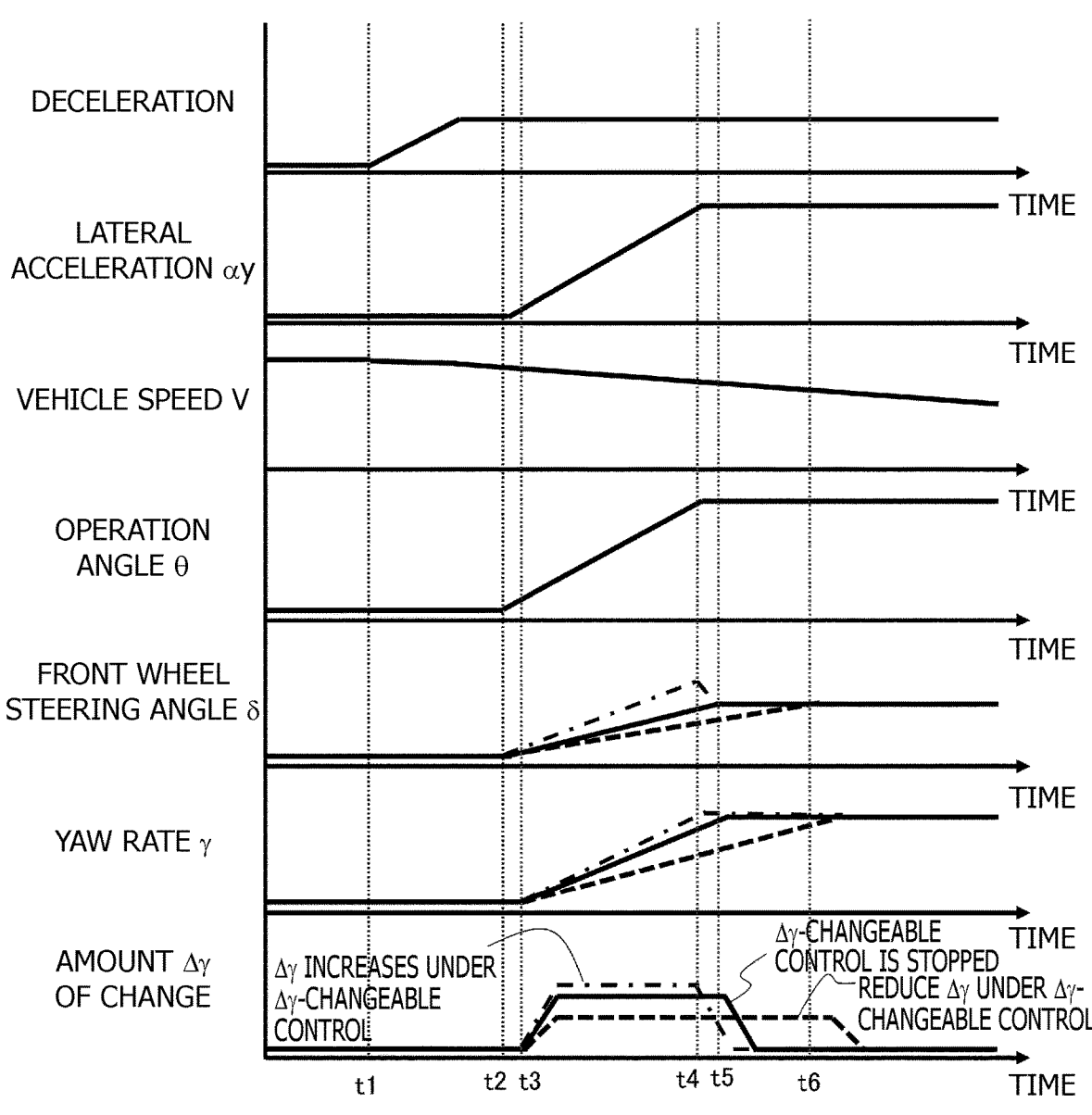
FIG. 6 is a time chart illustrating differences in a front wheel steering angle $\delta$, the yaw rate $\gamma$, and the amount $\Delta\gamma$ of change made by $\Delta\gamma$-changeable control.

FIG. 6 is a time chart illustrating an example of changes in deceleration, lateral acceleration, a yaw rate, and the like in a situation in which the Δγ-changeable control for actively allowing the amount Δγ of change to be changed by changing the gain Gst comes into operation.

It is to be noted that a solid line of FIG. 6 indicates characteristics obtained by stopping the Δγ-changeable control, that is, fixing the gain Gst at 1.0.

In addition, a dotted line of FIG. 6 indicates characteristics obtained by actively suppressing an increase in the amount Δγ of change by decreasing the gain Gst to less than 1.0.

Furthermore, a dash-dotted line of FIG. 6 indicates characteristics obtained by actively increasing the amount Δγ of change by increasing the gain Gst to greater than 1.0.

Vehicle 100 starts to decelerate at time t1 at which vehicle 100 travels straight at substantially constant speed. At subsequent time t2, a driver starts to operate steering wheel 310 in any of the left and right directions from the neutral position.

The driver then turns steering wheel 310 more between the time t2 and time t4. After the time t4, the driver enters a steering wheel holding state in which the driver holds the operation angle θ obtained at the time t4.

That is, steering wheel 310 is located at the neutral position before the time t2. Steering wheel 310 is subjected to a steering operation in the right or left direction between the time t2 and the time t4.

When the operation angle θ changes along with the steering operation of the driver on steering wheel 310, microcomputer 510 sets the target yaw rate γtg in accordance with the operation angle θ and sets the steering angle command value δtg* to cause the estimation yaw rate γes (or the yaw rate γac) to follow the target yaw rate γtg.

Front wheels 101 and 102 are then steered in accordance with the steering angle command value δtg, thereby generating lateral acceleration and further generating a yaw rate in vehicle 100.

Here, microcomputer 510 sets the gain Gst to less than 1.0 in accordance with the deceleration and the lateral acceleration, thereby changing the final steering angle command value δg into a value less than the steering angle command value δtg* obtained by model following control section 511 as indicated by a dotted line in FIG. 6.

It is to be noted that whether the front wheel steering angle δ is large or small in the present application depends on whether the steering angle has a large or small absolute value if described in detail. Decreasing the steering angle command value δtg brings the steering angle command value δtg closer to the neutral position.

Processing of correcting the steering angle command value δtg with the gain Gst slows change in the steering angle of front wheels 101 and 102 corresponding to a steering operation on steering wheel 310 as compared with a case in which the correction processing is not carried out (in other words, a case in which the gain Gst is fixed to be equal to 1.0). Furthermore, the amount Δγ of change in the yaw rate γ per unit time is suppressed to be small as compared with a case in which the correction processing is not carried out.

That is, the characteristics indicated by a dotted line in the time chart of FIG. 6 indicate characteristics that, when a steering operation of a driver is input to steering operation input device 300 from the state in which vehicle 100 is decelerated while traveling straight, microcomputer 510 outputs the steering angle command value δtg (in other words, a control signal of steering motor 410) to suppress an increase in the amount Δγ of change in the yaw rate γ per unit time.

In this way, if the Δγ-changeable control for suppressing an increase in the amount Δγ of change in the yaw rate γ per unit time is carried out, it is possible to achieve the steering characteristics that are easy to handle for an ordinary driver and it is possible for the ordinary driver to easily perform an appropriate steering operation.

In addition, microcomputer 510 sets the gain Gst in response to deceleration and lateral acceleration in accordance with an increase and a decrease in the amount Δγ of change corresponding to the deceleration and the lateral acceleration. It is thus possible to smoothly change the amount Δγ of change in response to the changing deceleration and the changing lateral acceleration.

In addition, as indicated by a dash-dotted line in FIG. 6, it is possible for microcomputer 510 to change the final steering angle command value δtg with the gain Gst (Gst>1.0) into a value greater than the steering angle command value δtg* obtained by model following control section 511 in the processing of correcting the steering angle command value δtg with the gain Gst.

It is then possible for microcomputer 510 to increase the amount Δγ of change in the yaw rate γ per unit time by changing the steering angle command value δtg into the value greater than the steering angle command value δtg* as compared with a case in which the correction with the gain Gst is not carried out.

In a case in which the processing of correcting the steering angle command value δtg with the gain Gst is not carried out, the characteristics of the amount Δγ of change are uniquely defined by the characteristics and the specifications of vehicle 100 and a driver thus has to perform a steering operation that match the vehicle characteristics.

In contrast, if the Δγ-changeable control for correcting the steering angle command value δtg with the gain Gst is carried out, it is possible to change the characteristics of the amount Δγ of change into characteristics that match the preference and the skill of a driver, and increase the steering easiness or increase the steering accuracy.

It is possible for microcomputer 510 to carry out the processing of actively increasing the amount Δγ of change under the Δγ-changeable control when a counter-steering operation is performed that is a steering operation on steering wheel 310 in the direction opposite to the turning direction of vehicle 100.

For example, when a braking operation of a driver causes rear wheels 103 and 104 to skid while vehicle 100 is steadily traveling to make a turn at a constant steering angle and constant vehicle speed, the driver carries out the counter-steering of operating steering wheel 310 in the direction opposite to the turning direction of vehicle 100.

At this time, the operation angle θ of steering wheel 310 does not change before the driver performs a braking operation. The front wheel steering angle is thus retained. After the steering input of the counter-steering is made, the front wheel steering angle δ moves in the direction opposite to the turning direction.

Here, when the change in the front wheel steering angle δ is delayed with respect to the counter-steering operation by the driver, it is not possible to sufficiently reduce the skids of rear wheels 103 and 104, and vehicle 100 has unstable behavior.

Accordingly, microcomputer 510 carries out the Δγ-changeable control for actively increasing the amount Δγ of change in the yaw rate γ per unit time on the counter-steering operation made while vehicle 100 is making a turn, thereby preventing the change in the front wheel steering angle δ from being delayed in the counter-steering operation and preventing rear wheels 103 and 104 from skidding.

In other words, microcomputer 510 actively increases the amount Δγ of change in response to the counter-steering operation to assist the driver with the counter-steering operation.

Incidentally, in a case in which the driver is an experienced or professional driver having a driving skill higher than a standard driving skill, it is possible for microcomputer 510 to stop the Δγ-changeable control for actively allowing the amount Δγ of change to be changed (specifically, the gain Gst is fixed at 1.0).

In the case of an experienced driver or a professional driver, it is possible to perform an appropriate steering operation based on the understandings of the vehicle characteristics related to the amount Δγ of change in the yaw rate γ per unit time or a steering operation that makes the most of the vehicle characteristics. It is possible in some cases to perform a favorable steering operation when the Δγ-changeable control is not carried out.

Accordingly, microcomputer 510 acquires information indicating a mode-selected state of mode selection switch 650 as information related to the driving skill of a driver. When the driver is estimated to be an experienced or professional driver from the mode-selected state, microcomputer 510 stops the Δγ-changeable control.

Mode selection switch 650 is provided in vehicle 100 as a switch for a driver to optionally select the responsiveness (in other words, the responsiveness of a vehicle behavior) of the front wheel steering angle to a steering operation on steering wheel 310.

Mode selection switch 650 is then configured to select, for example, any of a normal mode for designating responsiveness adapted to a driver having ordinary skill and a sport mode for designating responsiveness that is higher than that of the normal mode and allows an experienced driver having driving skill higher than the standard driving skill to perform an appropriate steering operation.

That is, microcomputer 510 acquires information on a mode selected by mode selection switch 650 to acquire the information related to the driving skill of a driver. A function of mode selection switch 650 to acquire the mode selection information corresponds to a driving skill information acquisition section.

Figure 7:
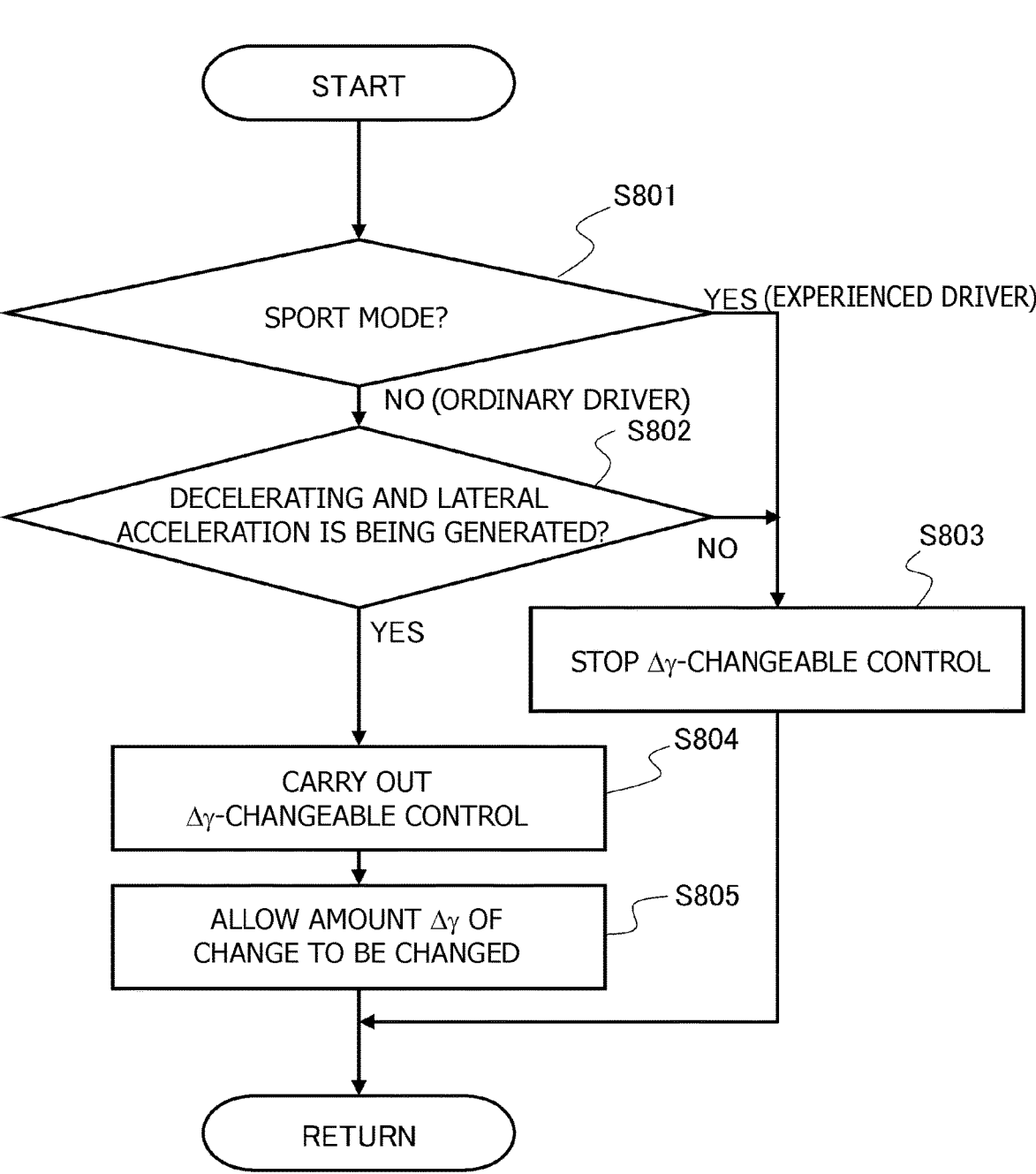
FIG. 7 is a flowchart illustrating a process performed when the control for actively allowing the amount $\Delta\gamma$ of change to be changed is carried out on the basis of driving skill of a driver.

FIG. 7 is a flowchart illustrating the process of setting the gain Gst. FIG. 7 illustrates the process of setting the gain Gst that includes processing of determining the mode-selected state by mode selection switch 650, in other words, processing of determining the driving skill of a driver.

It is to be noted that the processing of each of steps S802 to S805 in the flowchart of FIG. 7 is similar to the processing of each of steps S701 to S704 in the flowchart of FIG. 4 described above, and detailed description will be thus omitted.

Microcomputer 510 determines in step S801 whether or not mode selection switch 650 selects the sport mode for designating high responsiveness.

In a case in which a driver selects the sport mode with the mode selection switch 650, microcomputer 510 estimates that the driving skill of the driver to be higher than the standard driving skill and proceeds to step S803.

Microcomputer 510 then stops, in step S803, the Δγ-changeable control for actively allowing the amount Δγ of change to be changed by changing the gain Gst or the control for suppressing an increase in the amount Δγ of change if described in detail.

That is, in a case in which the driving skill of the driver is higher than the standard driving skill, microcomputer 510 controls steering motor 410 by using the steering angle command value δtg* obtained by model following control section 511 as the final steering angle command value δtg as it is.

Thus, in a case in which the driving skill of the driver is higher than the standard driving skill, the yaw rate γ generated in vehicle 100 in response to a steering operation on steering wheel 310 is changed by the characteristics uniquely defined by the characteristics and the specifications of vehicle 100.

It is then possible for the driver having a driving skill higher than the standard driving skill to perform an appropriate steering operation based on the understandings of the vehicle characteristics related to the amount Δγ of change or a steering operation that makes the most of the vehicle characteristics.

Additionally, it is possible to include the control for actively increasing the amount Δγ of change in a counter-steering operation in the Δγ-changeable control stopped by microcomputer 510 in a case in which the driver has a driving skill higher than the standard driving skill.

In addition, when the normal mode for designating low responsiveness is selected by mode selection switch 650 in step S801 and the driver is estimated to be an ordinary driver having a driving skill lower than the standard driving skill, microcomputer 510 proceeds to step S802.

Then, when microcomputer 510 determines in step S802 that vehicle 100 is decelerating and lateral acceleration is being generated, microcomputer 510 proceeds to step S804 and subsequent steps and carries out the Δγ-changeable control for actively allowing the amount Δγ of change to be changed by changing the gain Gst.

Thus, in the case of an ordinary driver, it is possible to perform a steering operation and/or obtain the assistance for a counter-steering operation with the characteristics that an increase in the amount Δγ of change is suppressed if mode selection switch 650 is operated to select the normal mode, thereby making it possible to achieve the steering characteristics that are easy to handle.

It is possible to appropriately use the respective technical ideas described in the embodiment in combination as long as inconsistency is avoided.

In addition, the contents of the present invention have been specifically described with reference to the preferred embodiment, but it would be obvious to those skilled in the art that a variety of modifications are adoptable on the basis of the fundamental technical concepts and teachings of the present invention.

The driving skill information acquisition section is not limited to the functional section of mode selection switch 650 that acquires the mode selection information.

For example, it is possible for microcomputer 510 to include, as the driving skill information acquisition section, a functional section that obtains an index value of the driving skill from a steering operation by a driver, and a history of lateral acceleration, front-rear acceleration, or the like generated through the steering operation.

It is then possible for microcomputer 510 to determine, by comparing the index value with a threshold, whether the skill of the driver is higher or lower than the standard skill, that is, whether the driver is an experienced driver or an ordinary driver.

In addition, in a case in which vehicle 100 includes a switch for a driver to optionally switch on and off the skid preventing device, it is possible for microcomputer 510 to treat turning on the skid preventing device as a command (in other words, a signal indicating that the driver is an ordinary driver) for carrying out the Δγ-changeable control and treat turning off the skid preventing device as a command (in other words, a signal indicating that the driver is an experienced driver) for stopping the yaw rate control.

In this case, a functional section that acquires information for turning on and off the skid preventing device corresponds to the driving skill information acquisition section.

In addition, the configuration in which the driving skill is divided into the two stages of a high stage and a low stage is not limiting. It is possible for microcomputer 510 to acquire information for dividing the driving skill into three or more stages and change, in the three or more stages, the degree to which the amount Δγ of change is actively allowed to be changed.

Here, it is possible for microcomputer 510 to include some types of maps (or functions) of the gain Gst corresponding to deceleration and lateral acceleration as illustrated in FIG. 5 and switch the maps (or the functions) that are used for the Δγ-changeable control in accordance with the levels of the driving skill.

In addition, it is possible for microcomputer 510 to actively allow the amount Δγ of change to be changed by setting a feedback gain to allow the feedback gain to be changed, for example, on the basis of the deviation between the target yaw rate γtg and the estimation yaw rate γes (or the yaw rate γac). The feedback gain is a gain in processing of setting an operation amount.

That is, means for actively allowing the amount Δγ of change to be changed is not limited to means for correcting the steering angle command value δtg so long as it is possible to actively allow the amount Δγ of change to be changed in response to a steering operation of a driver.

In addition, it is possible for steer-by-wire steering apparatus 200 to include a backup mechanism that mechanically couples steering wheel 310 and front wheels 101 and 102 with a clutch or the like.

In addition, it is possible for steer-by-wire steering apparatus 200 to include a first control device that outputs a control signal of steering motor 410 and a second control device that outputs a control signal of reaction force motor 330.

REFERENCE SYMBOL LIST

100 Vehicle
101, 102 Front wheel (steered wheel)
200 Steer-by-wire steering apparatus
300 Steering operation input device
340 Operation angle sensor
400 Steering device
410 Steering motor (steering actuator)
500 Control device
510 Microcomputer (controller)
511 Model following control section
512 Gain calculation section
513 Multiplication section
630 Longitudinal acceleration sensor

The invention claimed is:

1. A control device that is provided in a vehicle, the vehicle including a steer-by-wire steering apparatus that includes a steering operation input device configured to receive a steering operation of a driver of the vehicle, and a steering device including a steering actuator configured to apply a steering force to a wheel, the control device comprising:

a controller configured to output a control signal of the steering actuator, wherein the controller acquires a first physical quantity related to operation information on the steering operation input device, a second physical quantity related to deceleration of the vehicle in the traveling direction, and a third physical quantity related to lateral acceleration of the vehicle, obtains a target yaw rate based on the first physical quantity, performs feedback control for obtaining a control signal to cause a yaw rate generated in the vehicle to follow the target yaw rate, and allows a gain in the feedback control to be changed based on the second physical quantity and the third physical quantity, and changes an amount of change in the yaw rate per unit time, the yaw rate being generated in the vehicle in response to the steering operation.

2. The control device according to claim 1, wherein, when the controller detects, on the basis of the first physical quantity and the second physical quantity, that the steering operation of the driver is input to the steering operation input device from a state in which the vehicle is decelerated while traveling straight, the controller allows the gain to be changed based on the second physical quantity and the third physical quantity to suppress an increase in the amount of change in the yaw rate per unit time.

3. The control device according to claim 1, wherein the controller includes a driving skill information acquisition section configured to acquire information indicating a proficiency level of a driving skill of the driver, and when the controller detects, on the basis of the first physical quantity and the second physical quantity, that the steering operation of the driver is input to the steering operation input device from a state in which the vehicle is decelerated while traveling straight, the controller allows the gain to be changed, and when the controller allows the gain to be changed, the controller sets the gain to increase the amount of change in the yaw rate per unit time as the proficiency level of the driving skill is higher.

4. The control device according to claim 1, wherein, when the controller detects, on the basis of the first physical quantity and the second physical quantity, that a steering operation in a direction opposite to a turning direction is carried out from a state in which the vehicle is decelerated while making a turn, the controller sets the gain to increase the amount of change in the yaw rate per unit time corresponding to an input of the steering operation.

5. The control device according to claim 1, wherein the controller includes a driving skill information acquisition section configured to acquire information indicating the proficiency level of a driving skill of the driver, and when the controller detects, on the basis of the first physical quantity and the second physical quantity, that a steering operation in a direction opposite to a turning direction is carried out from a state in which the vehicle is decelerated while making a turn, the controller switches a processing of setting the gain from a processing in which the gain is changed based on the second physical quantity and the third physical quantity to a processing in which the gain is fixed based on the proficiency level of the driving skill.

6. The control device according to claim 1, wherein the controller obtains an estimation yaw rate by using a vehicle model having a steering angle of the wheel as an input value, the estimation yaw rate being an estimation value of the yaw rate that is generated in the vehicle, and the controller obtains the control signal to cause the estimation yaw rate to follow the target yaw rate obtained on a basis of the first physical quantity.

7. The control device according to claim 1, wherein the controller includes a driving skill information acquisition section configured to acquire information indicating the proficiency level of a driving skill of the driver, and the controller switches a processing of setting the gain from a processing in which the gain is changed based on the second physical quantity and the third physical quantity to a processing in which the gain is fixed based on the proficiency level of the driving skill.

8. A control method that is executed by a controller, the controller being mounted on a vehicle, the vehicle including a steer-by-wire steering apparatus, the steer-by-wire steering apparatus including a steering operation input device configured to receive a steering operation of a driver of the vehicle, and a steering device including a steering actuator configured to apply a steering force to a wheel of the vehicle, the control method comprising steps of:

acquiring a first physical quantity related to operation information on the steering operation input device, a second physical quantity related to deceleration of the vehicle in the traveling direction, and a third physical quantity related to lateral acceleration of the vehicle;

obtaining a target yaw rate based on the first physical quantity, and performing feedback control for obtaining a control signal to cause a yaw rate generated in the vehicle to follow the target yaw rate, the step of performing feedback control includes a step of allowing a gain in the feedback control to be changed based on the second physical quantity and the third physical quantity, and changing an amount of change in a yaw rate per unit time, the yaw rate being generated in the vehicle in response to the steering operation.

9. A control system that is provided in a vehicle, the control system comprising:

a steer-by-wire steering apparatus including a steering operation input device configured to receive a steering operation of a driver of a vehicle, and a steering device including a steering actuator configured to apply a steering force to a wheel of the vehicle; and a control device including a controller configured to output a control signal of the steering actuator, wherein the controller acquires a first physical quantity related to operation information on the steering operation input device, a second physical quantity related to deceleration of the vehicle in the traveling direction, and a third physical quantity related to lateral acceleration of the vehicle, obtains a target yaw rate based on the first physical quantity, performs feedback control for obtaining a control signal to cause a yaw rate generated in the vehicle to follow the target yaw rate, and allows a gain in the feedback control to be changed based on the second physical quantity and the third physical quantity, and changes an amount of change in the yaw rate per unit time, the yaw rate being generated in the vehicle in response to the steering operation.

10. The control device according to claim 1, wherein the controller includes a driving skill information acquisition section configured to acquire information indicating the proficiency level of a driving skill of the driver, and the controller changes setting characteristics of the gain for the second physical quantity and the third physical quantity in response to the high or low proficiency level of the driving skill.

11. The control device according to claim 10, wherein the vehicle includes a mode selection switch for optionally selecting response characteristics of a vehicle behavior with respect to an operation on the steering operation input device by the driver, and the driving skill information acquisition section acquires mode selection information of the mode selection switch as information indicating the proficiency level of the driving skill.

12. The control device according to claim 10, wherein the driving skill information acquisition section acquires information indicating the proficiency level of the driving skill from a steering operation by a driver, and a history of lateral acceleration, and front-rear acceleration generated through the steering operation.

13. The control device according to claim 10, wherein the vehicle includes a skid preventing device of which operation is optionally turned on or off by the driver, and the driving skill information acquisition section acquires information for turning on and off the skid preventing device as information indicating the proficiency level of the driving skill.

* * * * *